United States Patent [19]
Moore et al.

[11] Patent Number: 5,859,648
[45] Date of Patent: Jan. 12, 1999

[54] METHOD AND SYSTEM FOR PROVIDING SUBSTITUTE COMPUTER FONTS

[75] Inventors: George M. Moore, Redmond; Dennis Richard Adler; Eliyezer Kohen, both of Mercer Island, all of Wash.

[73] Assignee: Microsoft Corporation, Redmond, Wash.

[21] Appl. No.: 897,374

[22] Filed: Jul. 21, 1997

Related U.S. Application Data

[63] Continuation of Ser. No. 527,291, Sep. 12, 1995, abandoned, which is a continuation of Ser. No. 85,482, Jun. 30, 1993, abandoned.

[51] Int. Cl.[6] .................................................. G06F 17/21
[52] U.S. Cl. ........................... 345/471; 707/542; 707/519
[58] Field of Search .................................. 345/467–469, 345/471, 472; 707/519, 542

[56] References Cited

U.S. PATENT DOCUMENTS

| | | | |
|---|---|---|---|
| 3,964,591 | 6/1976 | Hill et al. ................................. | 395/110 |
| 4,591,999 | 5/1986 | Logan ...................................... | 707/519 |
| 4,675,830 | 6/1987 | Hawkins .............................. | 345/469 X |
| 4,933,866 | 6/1990 | Markoff et al. ......................... | 345/471 |
| 4,987,550 | 1/1991 | Leonard et al. ......................... | 345/471 |
| 5,042,075 | 8/1991 | Sato ..................................... | 345/471 X |
| 5,099,435 | 3/1992 | Collins et al. ........................... | 345/428 |
| 5,167,013 | 11/1992 | Hube et al. .............................. | 395/110 |
| 5,185,818 | 2/1993 | Warnock .............................. | 707/542 X |
| 5,218,460 | 6/1993 | Nakajima ................................. | 358/456 |
| 5,257,016 | 10/1993 | Fuji et al. ................................ | 345/471 |
| 5,274,365 | 12/1993 | Martinez et al. ..................... | 345/471 X |
| 5,281,959 | 1/1994 | Martinez et al. ..................... | 345/471 X |
| 5,291,186 | 3/1994 | Martinez et al. ..................... | 345/471 X |
| 5,304,989 | 4/1994 | Martinez et al. ........................ | 345/471 |
| 5,319,358 | 6/1994 | Martinez et al. ..................... | 345/471 X |
| 5,325,479 | 6/1994 | Kaasila ................................... | 345/469 |
| 5,495,577 | 2/1996 | Davis et al. ............................. | 707/542 |
| 5,506,940 | 4/1996 | Bamford et al. ........................ | 395/110 |
| 5,533,174 | 7/1996 | Flowers, Jr. et al. ................... | 395/114 |
| 5,548,695 | 8/1996 | Asano et al. ............................ | 345/433 |
| 5,664,086 | 9/1997 | Brock et al. ............................ | 345/468 |

FOREIGN PATENT DOCUMENTS

| | | | |
|---|---|---|---|
| 0478339 A1 | 4/1992 | European Pat. Off. ........ | G06F 17/21 |
| 0518554 A2 | 12/1992 | European Pat. Off. ........ | G06F 17/21 |

OTHER PUBLICATIONS

Seybold, Microsoft Licenses Panose Font Scheme, Seybold Report on Desktop Publishing, Jun. 17, 1991, pp. 40–41.
"Adobe's Super ATM:Super Font Swapper," *MacUser*, Feb. 1993, p. 47.

*Primary Examiner*—Anton Fetting
*Attorney, Agent, or Firm*—Seed and Berry LLP

[57] ABSTRACT

A method and system for providing a substitute font that visually approximates a selected font that is unavailable in a computer system is provided. In a preferred embodiment of the present invention, the method and system first selects as the substitute font a font that is available in the computer system. The method and system then adjusts the overall widths of the characters of the substitute font to match the overall widths of the corresponding characters of the selected font. This causes the same combinations of characters of the substitute font and of the selected font to have substantially the same size and appearance. The method and system then makes the substitute font available to a program that has requested the selected font.

61 Claims, 9 Drawing Sheets

METHOD AND SYSTEM FOR PROVIDING SUBSTITUTE COMPUTER FONTS

CROSS-REFERENCE TO RELATED APPLICATIONS

This application is a continuation of U.S. patent application Ser. No. 08/527,291, filed Sep. 12, 1995, for "METHOD AND SYSTEM FOR PROVIDING SUBSTITUTE COMPUTER FONTS", now abandoned, which is a continuation of application Ser. No. 08/085,482, filed Jun. 30, 1993, for "METHOD AND SYSTEM FOR PROVIDING SUBSTITUTE COMPUTER FONTS (CREATEBESTFONT),"now abandoned.

TECHNICAL FIELD

The invention relates generally to a method and system for providing computer fonts, and, more specifically, to a method and system for providing a substitute computer font for a font that is unavailable within a computer system.

BACKGROUND OF THE INVENTION

Most general purpose computer systems (computers) are able to display text, comprised of characters (letters, numerals, and other symbols), on attached display devices, such as monitors and printers. A monitor consists of a grid of points, or pixels, each of which can be individually illuminated. Computer printers and other computer display devices also use pixels to display images.

In order to display text on a display device, computers use one or more raster fonts. A raster font is comprised of character bitmaps. Each character bitmap contains data reflecting which pixels in a subset of the display grid must be illuminated in order to form a particular character. When a computer needs to display a particular character at a display location, it accesses the bitmap for that character. The computer then turns the illumination of pixels near the display position on or off in accordance with the data stored in the character bitmap. FIG. 1A is a diagram showing how one possible bitmap of the letter A could be displayed on a display device.

At one point, computers each used only a single raster font, permanently stored in read only memory. Since then, computers have been adapted to use several different raster fonts simultaneously. This permits a user to display text in more than one typeface and point size. (A typeface is a specific design for a set of characters. Point size is a measurement of the height of a font's characters.) These raster fonts are now stored in writeable random access memory, which allows existing raster fonts to be altered and new raster fonts added.

Computers now also use another, more robust type of font, called outline fonts. Outline fonts contain an outline for each character, comprised of straight lines and curves that form the shape of the character's outline. FIG. 1B is a diagram showing one possible outline of the letter A. The outline font describes these straight lines and curves in terms of an arbitrary system of coordinates. The computer can resize these character outlines to any point size, then convert them to a raster font. Outline fonts also contain hints, which are routines that, when executed, adjust the shapes of the outlines for various point sizes to improve their appearance.

Computers use outline fonts to create raster fonts in various sizes. Computers also transmit outline fonts to smart display devices that are themselves able to create raster fonts from the outline fonts. Many computers now store several outline fonts, each corresponding to a different typeface.

Using outline fonts, computers can now create raster fonts dynamically in different typefaces in response to the needs of users. Computer programs like ProvideRaster provide this service. FIG. 2 is a flow diagram of the ProvideRaster program. This program is an example of a font manager program that is called by application programs (applications), such as a word processor or a spreadsheet, when they require a raster font. The program is passed a requested typeface name, point size, and horizontal and vertical densities of the intended display device. The program returns a raster font of the requested typeface and point size for the intended display device.

In step 201, if a raster font of the correct point size and horizontal and vertical pixel density is available within the computer, then the program continues at step 202, else the program continues at step 203. In step 202, the program retrieves the appropriate raster font. The program then returns the retrieved raster font to the application program.

In step 203, if an outline font for the requested typeface is available within the computer, then the program continues in step 204, else the program continues in step 205 to create a substitute font for the unavailable outline font. In step 204, the program retrieves the outline font for the requested typeface, which contains both character outlines and hints. The program then continues at step 206.

In step 205, the program calls CreateSubstituteFont to produce a substitute outline font that visually approximates the unavailable outline font. The program passes CreateSubstituteFont the unavailable outline font name. The CreateSubstituteFont program returns a substitute outline font for the unavailable font, which contains both character outlines and hints. The details of CreateSubstituteFont are discussed further below. When CreateSubstituteFont returns, the program continues at step 206.

In step 206, the program calls a ConvertToRaster program, passing it the outline font retrieved or created, the requested point size, and the requested horizontal and vertical densities. The program then returns the raster font created by ConvertToRaster to the application program.

FIG. 3 is a flow diagram of ConvertToRaster. The program receives as parameters an outline font, a requested point size, and a requested horizontal and vertical density. The outline font contains character outlines and hints.

In step 301, the program resizes the character outlines of the outline font to the requested point size by multiplying the coordinates that define the outlines' lines and curves by the requested point size. This alters the height and width of each character. In step 302, the program applies the hints of the outline font to the magnified outlines.

FIGS. 4A–B are screen images demonstrating the need to use hints to improve the appearance of rasterized outlines. FIG. 4A is a screen image showing a letter "n" that has been rasterized without first being hinted. The unhinted letter's left base serif 401 does not match its right base serif 402. Further, its left vertical stem 403 is wider than its right vertical stem 404. Finally, its crown 405 is skewed toward the top row of pixels. FIG. 4B is a screen image showing a letter "n" that was rasterized after being hinted. The hinted letter's base serifs 411 and 412 are of the same width relative to their respective vertical stems 413 and 414. Those vertical stems are both now two pixels wide. The height of its crown 415 has been balanced by moving the vertical stems apart slightly. The hints demonstrated by FIG. 4B ensure the symmetry and regularity of the characters of a font. Other traditional hints ensure the vertical alignment of corresponding features of characters. Further traditional hints ensure good color—that is, consistent weighting among characters of a font. Applying hints to a character is said to regularize the character.

In step 303, the program rasterizes the hinted outlines of the outline font by superimposing a grid corresponding to the horizontal and vertical density of the intended display device over the hinted outlines, then turning on any pixels of the grid whose centers fall within the hinted outlines. This technique is well known in the art of digital typography. The program returns the resulting raster font to the application program, which may use it to display text. The raster font may also be stored in a buffer to be used to satisfy any identical requests received in the future.

The function served by CreateSubstituteFont is quite important. It is difficult for a computer user to anticipate which outline fonts he or she will need. Outline fonts will hereafter be referred to simply as fonts. Since individual fonts can be expensive to license, and even more expensive to independently develop, it has become quite useful for a computer to be able to construct a substitute font for an unavailable font.

The substitute fonts created by CreateSubstituteFont should: (1) be similar in appearance to the unavailable font, if possible; and (2) have exactly the same overall character widths as the unavailable font. These requirements are dictated by the paradigm of using the substitute font in place of the unavailable font to display a particular section of text in a document. The first requirement ensures that a sense of any aesthetics intended for the section will be conveyed. The second requirement ensures that lines and pages will break at the correct points.

Existing implementations of CreateSubstituteFont work by selecting an available font (the basis font) on which to base the substitute font, then modifying the basis font to create the substitute font. Basis font selection processes vary, as do their effectiveness at selecting a basis font with an appearance similar to the unavailable font.

Modification processes typically consist only of adding space before or after each character of the basis font whose overall width is smaller than the corresponding character of the unavailable font. Such implementations produce fonts with the same overall character widths in the case of characters of the basis font whose overall widths are smaller than or equal to those of the corresponding characters of the unavailable font. Such implementations cannot, however, produce fonts with the same overall character widths in the case of characters of the basis font whose overall widths are larger than those of the corresponding character of the unavailable font. It can be seen that these implementations of CreateSubstituteFont satisfy the first requirement for substitute fonts to varying degrees, and the second, more important requirement only sporadically.

SUMMARY OF THE INVENTION

It is an object of the present invention to provide a method and system for adjusting the overall widths of characters of a substitute font to match the overall widths of corresponding characters of an unavailable font.

It is another object of the present invention to provide a method and system for adjusting the overall widths of the characters of a substitute font by scaling each character horizontally.

It is a further object of the present invention to provide a method and system for adjusting the overall widths of the characters of a substitute font by adjusting the leading width before and the leading width after each character.

These and further objects, which will become apparent as the invention is more fully described below, are obtained by an improved method and system for providing a substitute font that visually approximates a selected font that is unavailable in a computer system. In a preferred embodiment of the present invention, the method and system first selects a font that is available in the computer system as the substitute font. The method and system then adjusts the overall widths of the characters of the substitute font to match the overall Widths of the corresponding characters of the selected Font. This causes the same combinations of characters of the substitute font and of the selected font to have substantially the same size and appearance. The method and system then makes the substitute font available to a program that has requested the selected font.

DETAILED DESCRIPTION OF THE INVENTION

The present invention relates to a method and system for providing a substitute outline font for an outline font that is unavailable within a computer system. outline fonts will hereafter be referred to simply as fonts. In a preferred embodiment of the present invention, the ProvideRaster program calls a CreateBestFont program (CreateBestFont) in place of CreateSubstituteFont to produce a substitute font for an unavailable font.

CreateBestFont is passed the unavailable font name. The program proceeds by attempting to identify a visually similar basis font selected by a Map program whose character widths are all within a predetermined tolerance of the unavailable font's character widths. If such a basis font exists, the program adjusts the space before and after every character of the basis font so that the overall width of each of its characters is equal to that of the corresponding character of the unavailable font. The resulting substitute font has an appearance that is similar to that of the unavailable font; the same overall character widths as the unavailable font; and the same color as the basis font, which is presumably good.

Otherwise, the program selects a font whose characters it can modify to be the correct width. It then calls a Scale program (Scale) to do the actual modification. The resulting substitute font has an appearance that is somewhat similar to that of the unavailable font, the same overall character widths as the unavailable font, and good color. Modifiable fonts contain special hints that ensure that the modifiable fonts will have consistent stem width when modified.

Figure 1A:
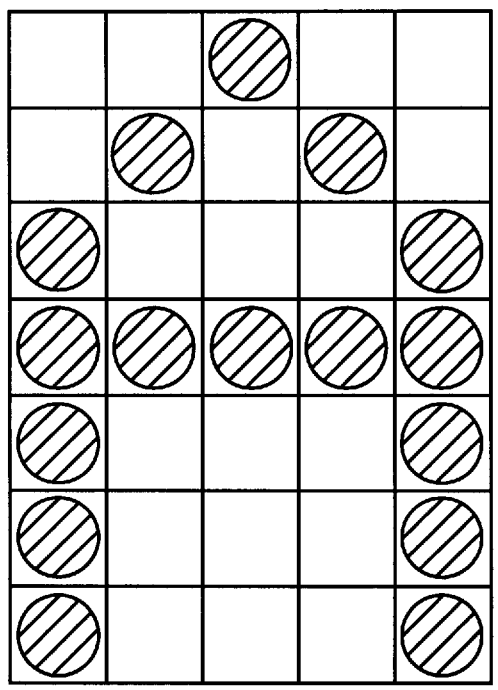
FIG. 1A is a diagram showing how one possible bitmap of the letter A could be displayed on a display device.
Figure 1B:
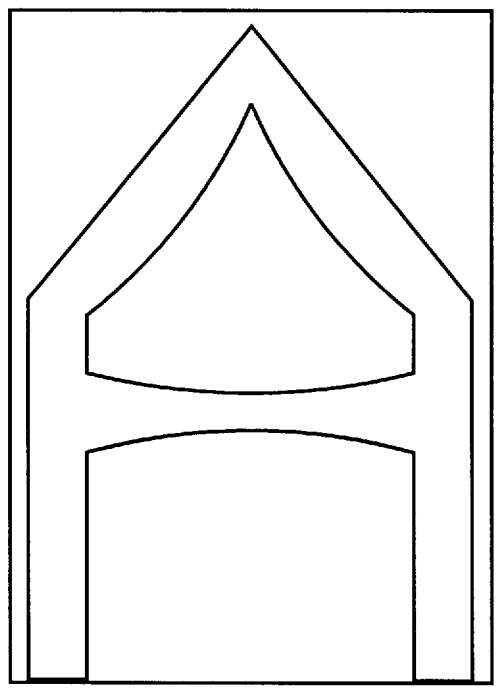
FIG. 1B is a diagram showing one possible outline of the letter A.
Figure 2:
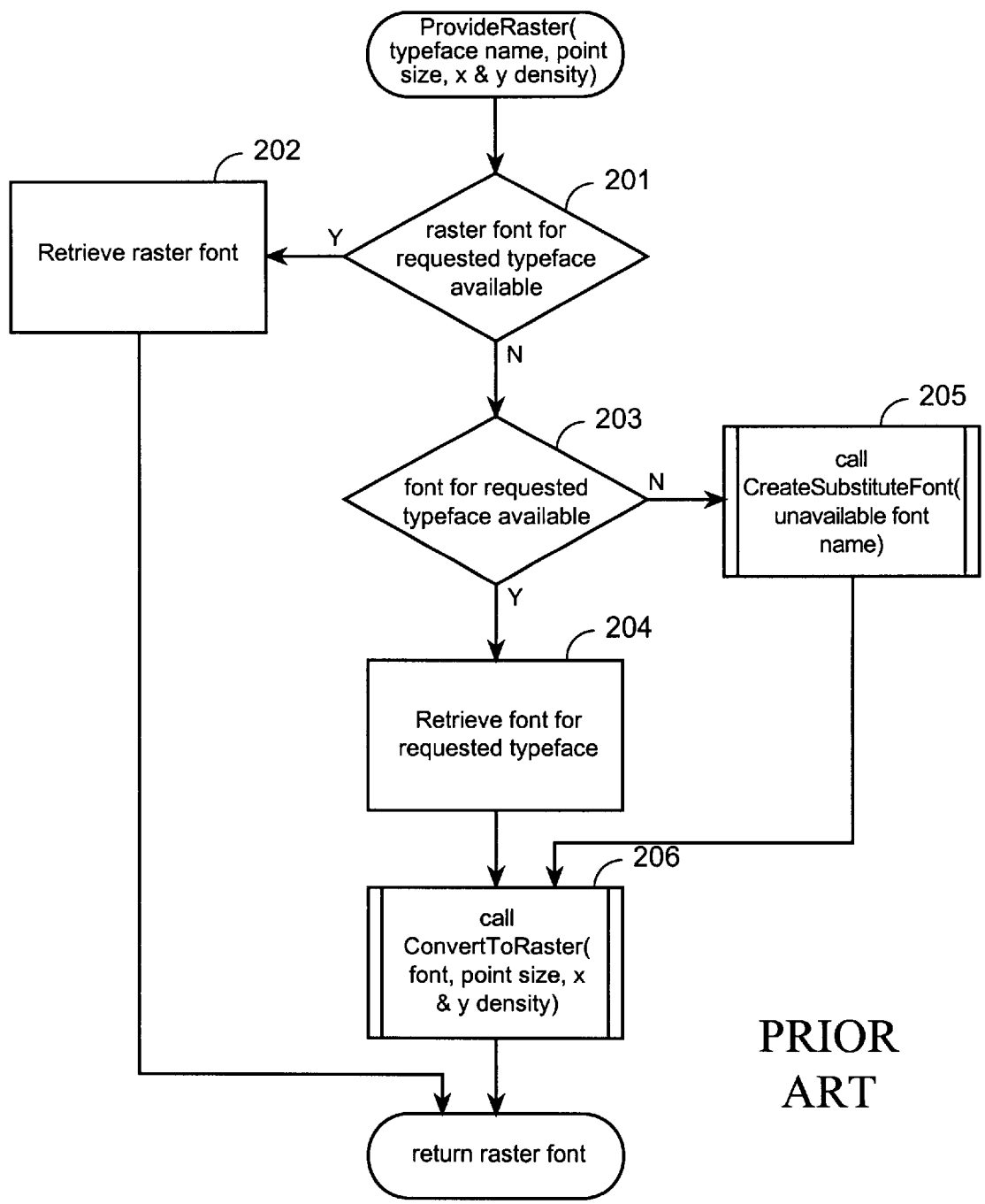
FIG. 2 is a flow diagram of ProvideRaster.
Figure 3:
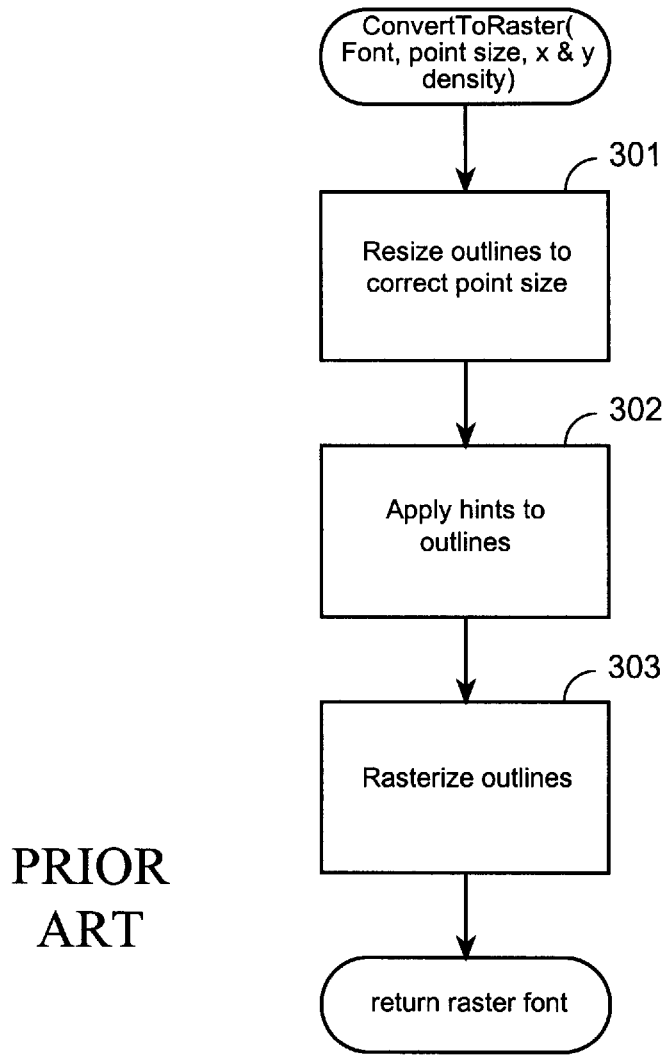
FIG. 3 is a flow diagram of ConvertToRaster.
Figure 4A:
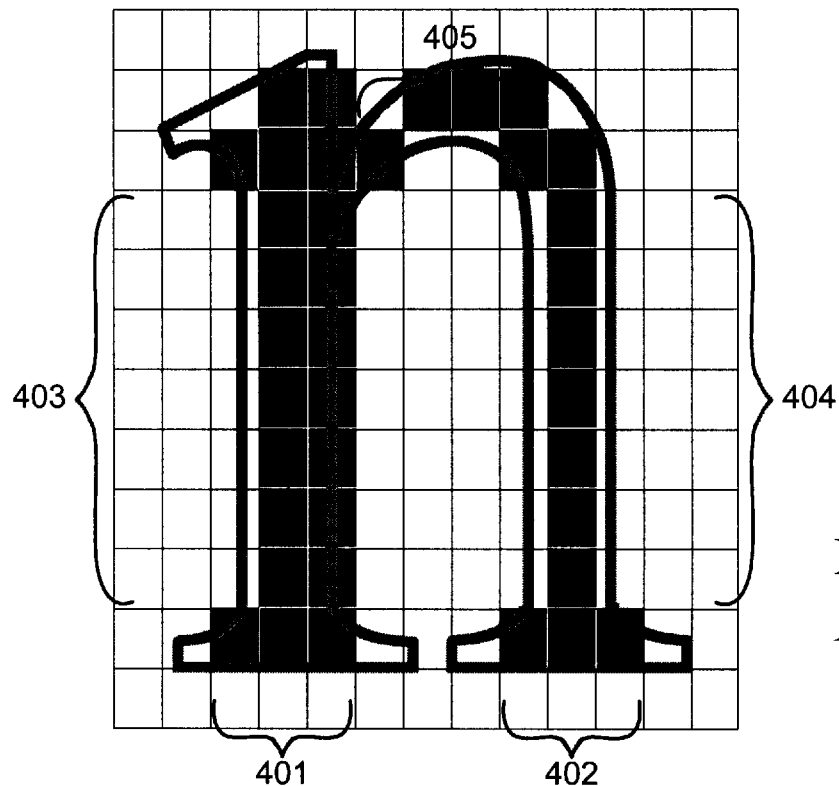
FIG. 4A is a screen image showing a letter "n" that has been rasterized without first being hinted.
Figure 4B:
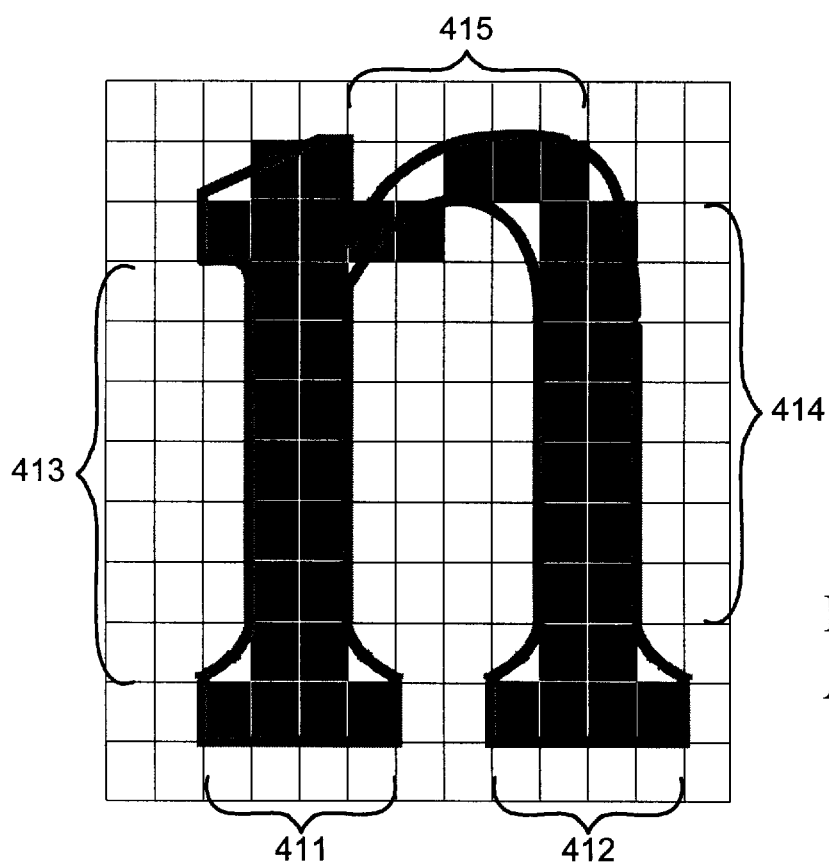
FIG. 4B is a screen image showing a letter "n" that was rasterized after being hinted.
Figure 5:
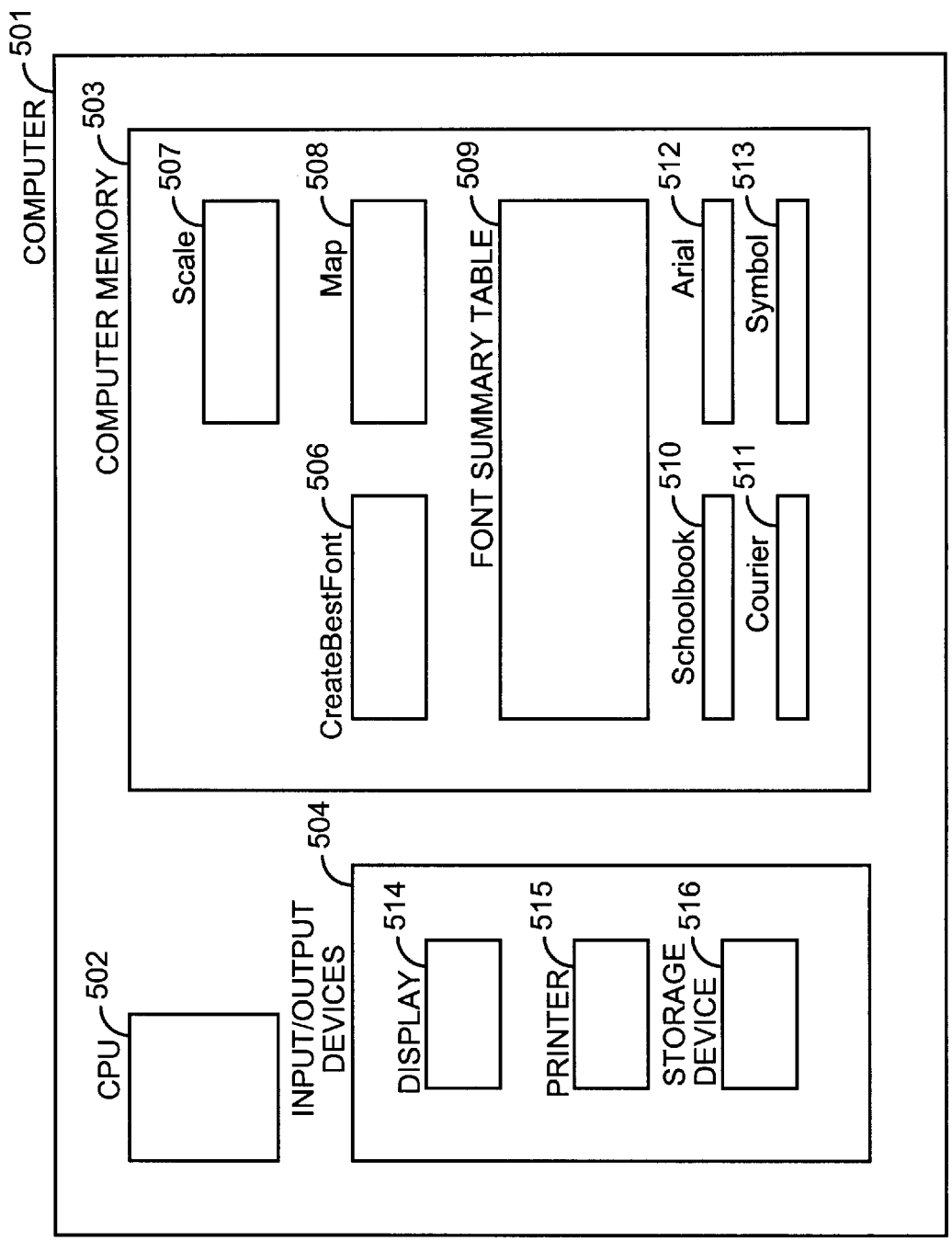
FIG. 5 is a high-level diagram of the general-purpose computer system on which the CreateBestFont, Map, and Scale programs preferably execute.

FIG. 5 is a high-level diagram of the general purpose computer system on which the CreateBestFont, Map, and Scale programs preferably execute. The computer 501 contains a central processing unit (cpu) 502, a computer memory 503, and input/output devices 504. The computer memory contains the CreateBestFont program 506, the Scale program 507, the Map program 508, a font summary table (table) 509, and fonts 510–513. The input/output devices include a display device 514, a printer 515, and a storage device 516 such as a hard disk drive. The font summary table contains summary information on a large number of popular fonts. Each row of the table corresponds to a single font, and contains that font's name, the overall width of each of the font's characters, an indication of whether the font is a serif font or a sans serif font, and an encoded visual appearance assessment for the font.

Programs such as ProvideRaster call CreateBestFont to produce a substitute font for an unavailable font, passing it the unavailable font name. CreateBestFont proceeds by attempting to identify a visually similar font whose character widths are all within a predetermined tolerance of the unavailable font's character widths. If such a basis font exists, the program adjusts the space before and after every character of the basis font so that the width of each of its characters is equal to that of the corresponding character of the unavailable font. Otherwise, the program selects a modifiable font whose characters it can modify to be the correct width. It then calls Scale to do the actual modification. Modifiable fonts contain special hints that ensure that the resultant fonts will have good color.

Figure 6:
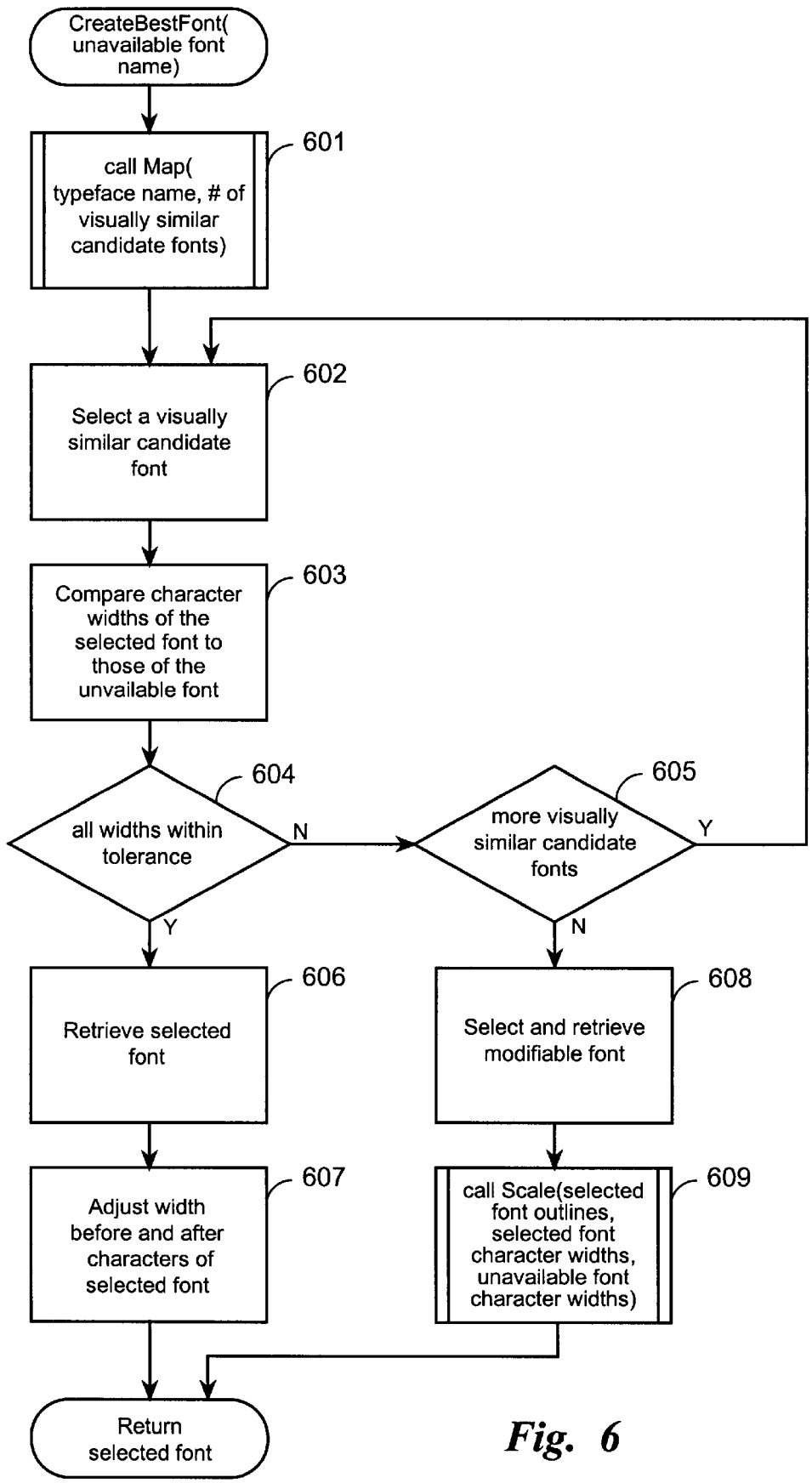
FIG. 6 is a flow diagram of CreateBestFont.

FIG. 6 is a flow diagram of CreateBestFont. In step 601, the program calls the Map program to identify visually similar fonts that are available within the computer. The program passes Map the unavailable font name and a predetermined number of candidate fonts to return. Map uses the encoded visual appearance assessments (codes) for the most popular fonts in general use stored in the font summary table. Fonts and their codes may be included in the table even if no font is available for them within the computer. In a preferred embodiment, the codes are determined in accordance with the ElseWare PANOSE™ font matching system. Codes determined in accordance with the PANOSE system contain information on family kind, serif style, weight, proportion, contrast, stroke variation, arm style, letter form, midline, and X-height. In a further preferred embodiment, codes for at least 100 fonts are included in the table.

Figure 7:
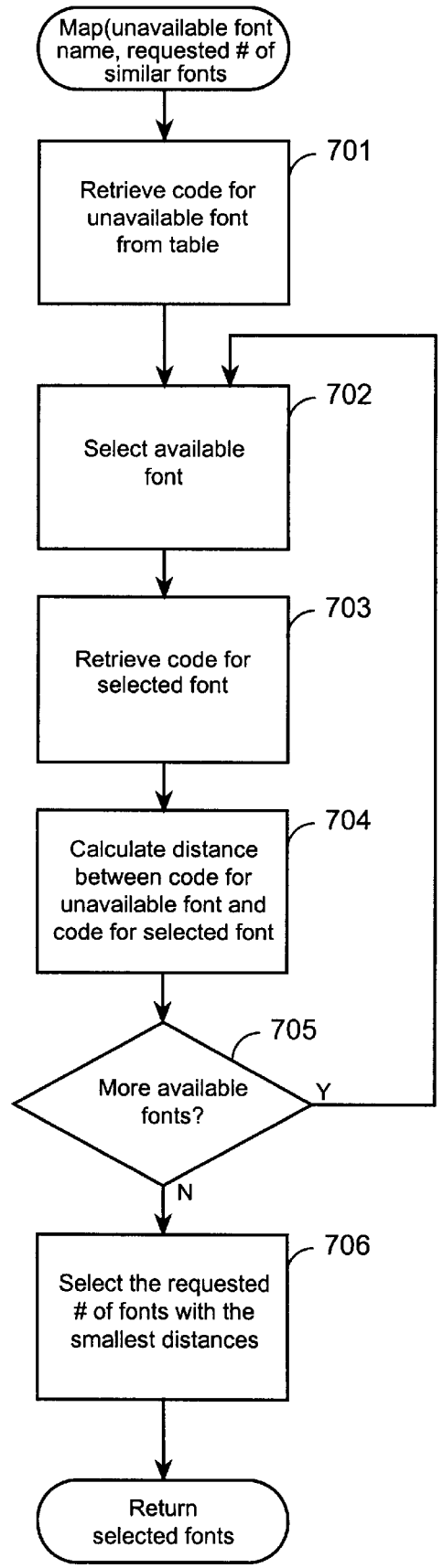
FIG. 7 is a flow diagram of a well-known embodiment of Map.

FIG. 7 is a flow diagram of a well-known embodiment of Map. In step 701, the program retrieves the code for the unavailable font from the font summary table. In steps 702–705, Map calculates the distance from the unavailable font for each of the available fonts. In step 702, the program selects an available font. In step 703, the program retrieves the code for the selected font from the table. In step 704, the program calculates the distance between the code for the unavailable font and the code for the selected font. This calculation involves, for each digit of the code, squaring the difference between the unavailable font digit value and the selected font digit value. The squares are then added to yield the distance. In step 705, if more available fonts remain, then the program continues at step 702, else the program continues at step 706. In step 706 the program selects the requested number of fonts with the smallest distances from the unavailable font. The program then returns the selected fonts to CreateBestFont.

Table 1 below is a partial simplified view of the font summary table. It shows the font name and associated code for each of several fonts. The description below details how Map would behave if this font summary table was present on the system and Map was called with the parameters (unavailable font name=Times New Roman, requested number of similar fonts=2).

TABLE 1

| Font Name | Code |
| --- | --- |
| Arial | 2 2 2 2 2 2 2 2 2 2 |
| Courier | 0 2 2 3 4 5 7 6 8 9 |
| Schoolbook | 2 2 2 2 5 5 5 8 8 8 |
| Symbol | 9 8 7 6 5 4 3 2 1 0 |
| Times New Roman | 0 1 2 3 4 5 6 7 8 9 |
| 0 | 0 |
| 0 | 0 |
| 0 | 0 |

Map first retrieves the code for the unavailable font, Times New Roman, from the table—0123456789. Map then selects the first available font, Arial, and retrieves its code—2222222222. Then Map calculates the distance between the code for Times New Roman and the code for Arial. This calculation involves, for each code digit, squaring the difference between the unavailable font code digit and the selected font code digit. The squares are then added to yield the distance. The distance between Arial and Times New Roman is:

$$(2-0)^2 + (2-1)^2 + (2-2)^2 + (2-3)^2 + (2-4)^2 +$$
$$(2-5)^2 + (2-6)^2 + (2-7)^2 + (2-8)^2 +$$
$$(2-9)^2 = 4 + 1 + 0 + 1 + 4 + 9 + 16 + 25 + 36 + 49 = 145.$$

This process of calculating the distance from Times New Roman is then repeated for each of any other remaining available fonts in the table. Map then selects the two fonts with the smallest distances from Times New Roman. These are Courier, with a distance of 3, and Schoolbook, with a distance of 10. Map then returns these two fonts.

In an alternate embodiment, each font available on the system is stored with a list of fonts to which it is visually similar. Each font is listed with a relative similarity rating value. In this embodiment, Map identifies fonts that are visually similar to the unavailable font by reading the list associated with each available font to identify the fonts that are similar to the unavailable font, and returning the requested number of fonts whose similarity rating values are the highest.

In steps 602–605, the program selects each visually similar candidate font in turn, checking to see whether its character widths are within a predetermined tolerance of those of the requested font. In step 602, the program selects a visually similar font from among the candidates returned by Map. In step 603, the program compares the overall width of each character of the selected font to that of the corresponding character of the unavailable font.

Figure 8:
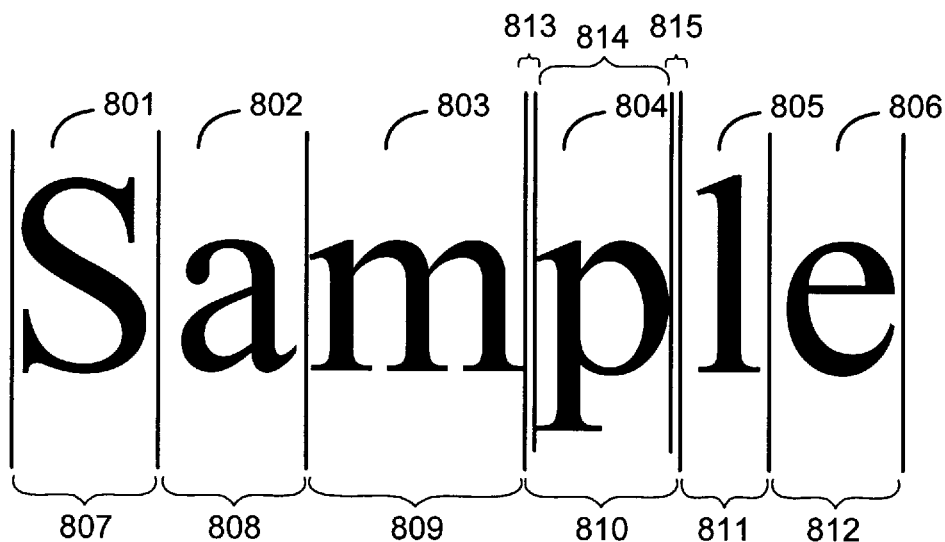
FIG. 8 is a diagram showing the overall width of a sample character, and its relationship to other horizontal measures of the character.

FIG. 8 is a diagram showing the overall width of a sample character, and its relationship to other horizontal measures of the character. Characters 801–806 have been displayed by an application program displaying the word "Sample" in the Times New Roman font. The character "p" 804 has an overall width 810, made up of a leading width 813, a horizontal extent 814, and a trailing width 815. The other characters shown also have these measures.

The overall widths of the characters of popular fonts are stored in the font summary table. In step 603, the program accesses the overall widths from the rows of the table corresponding to the unavailable font and the selected font in order to carry out its comparison of them.

In step 604, if all of the overall widths of the characters of the selected font are within a threshold proportion of the overall widths of the corresponding characters of the unavailable font, then the program continues at step 606 to use the selected font, else the program continues at step 605. In step 605, if more visually similar candidate fonts remain, then the program continues at step 602 to select one of them, else the program continues at step 608.

In an alternate embodiment, instead of calling Map to request a relatively large number of visually similar fonts, the program calls Map to request a smaller number of visually similar fonts. In this embodiment, the program calls Map again for more visually similar fonts if no fonts in the first group had overall character widths within a threshold proportion of the overall widths of the corresponding characters of the unavailable font.

Steps 606–607 are the path for generating the substitute font when a visually similar font has acceptable character widths. In step 606, the program retrieves the font corresponding to the selected font from memory. The font is preferably retrieved from a file stored on the storage device, using the font name. This becomes the basis font. In step 607, the program adjusts the leading and trailing width of each character of the basis font to make its overall width equal to the overall width of the corresponding character in the unavailable font. The program then returns the basis font, and the basis font becomes the substitute font.

Steps 608–609 are the path for generating the substitute font when no visually similar font has acceptable character widths. In step 608, the program selects and retrieves from memory a font that has been specially adapted to support the horizontal expansion and compression of the overall widths of its characters. The font is preferably retrieved from a file stored on the storage device, using the font name. These modifiable fonts have been adapted by adding special hints that ensure that the color of the font is good after expansion and/or compression by regularizing vertical stem width among characters. Special hints are discussed further in conjunction with Scale. The selected modifiable font becomes the basis font.

In a preferred embodiment, it is sufficient for there to be only two modifiable fonts with specials hints, one a font for a serif font and one a font for a sans serif font. (Characters of serif fonts have short lines or ornaments at the ends of their stems, while characters of sans serif fonts do not.) In this embodiment, the selection process simply selects the serif font as the basis font for serif unavailable fonts and the sans serif font as the basis font for sans serif unavailable fonts. An indication of whether each popular font is a serif font or a sans serif font is stored in the table. In this embodiment, the program accesses the row of the table corresponding to the unavailable font to determine whether the unavailable font is a serif or a sans serif font.

In step 609, the program calls Scale to horizontally scale each character of the selected basis font to the correct width. The program passes the outlines of the basis font, the overall character widths of the basis font, and the overall character widths of the unavailable font to Scale. When Scale returns, the program returns the scaled basis font. This becomes the substitute font.

Figure 9:
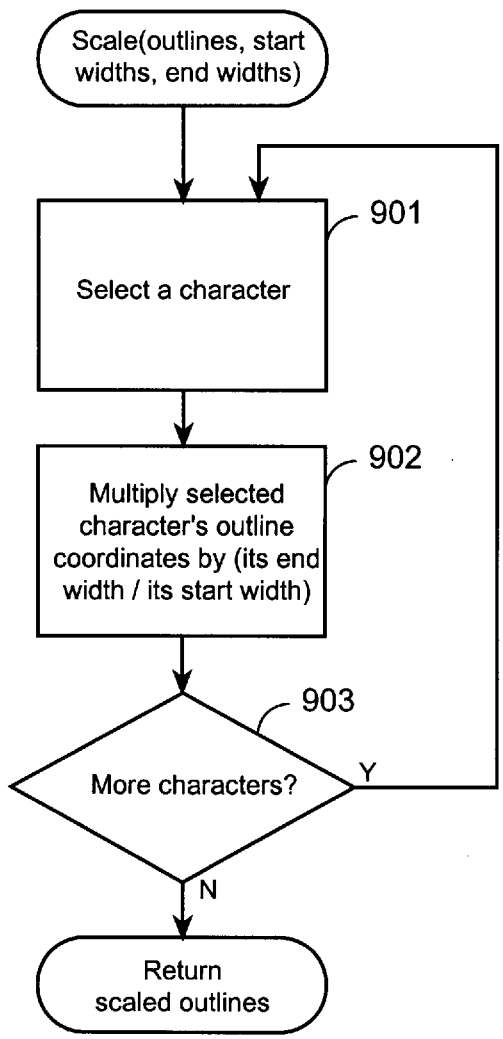
FIG. 9 is a flow diagram of Scale.

FIG. 9 is a flow diagram of Scale. The program receives as parameters a set of character outlines, starting overall character widths, and ending overall character widths. The program scales each character outline to the ending width specified. In steps 901–903, the program cycles through all of the character outlines, scaling each one. In step 901, the program selects a character outline. In step 902, the program scales the selected character outline to the correct width by multiplying each of its outline coordinates by its starting overall character width and dividing it by its ending overall character width. In step 903, if more character outlines remain, then the program continues at step 901 to select one of them, else the program returns the scaled outlines.

Figure 10:
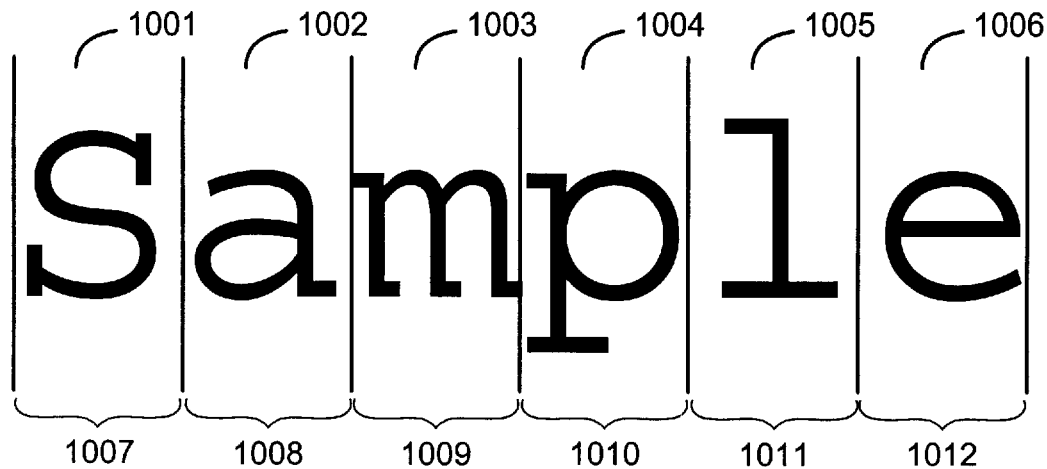
FIG. 10 is a diagram showing the overall width of sample characters of a font called Courier.

FIG. 10 is a diagram showing the overall widths of sample characters of the Courier font. The word "Sample" is formed by characters 1001–1006, having respective overall widths 1007–1012. Overall widths 807–812 (Times New Roman) and 1007–1012 (Courier) for the characters displayed are expressed numerically in columns 2 and 3 of Table 2 below, which lists characters alphabetically, with capitals first.

TABLE 2

| Character | Courier Width | Times New Roman Width | Scale Multiplier |
|---|---|---|---|
| ... | | | |
| S | 100 | 100 | 1 |
| ... | | | |
| a | 100 | 85 | .85 |
| ... | | | |
| e | 100 | 80 | .8 |
| ... | | | |
| l | 100 | 55 | .55 |
| m | 100 | 140 | 1.4 |
| ... | | | |
| p | 100 | 105 | 1.05 |
| ... | | | |

If Times New Roman was the unavailable font, and CreateBestFont selected Courier as the modifiable font and called Scale in order to scale the character widths of Courier to those of Times New Roman, Scale would proceed as follows. Scale's outlines parameter contains the character outlines from the Courier font. The start widths parameter contains the overall widths for the characters of the Courier font. The end widths parameter contains the overall widths of the Times New Roman font. For each character, Scale multiplies that character's outline coordinates by the ratio of its end width over its start width. In the case of the character "S", Scale would multiply the outline coordinates by 100/100=1. The multipliers for other selected characters are shown in the fourth column of Table 2. After scaling all the outlines, Scale would return them to CreateBestFont.

The special hints included in the adapted fonts must correct irregularities caused by the horizontal scaling process. The special hints, along with the traditional hints of the basis modifiable font, are applied to the scaled outlines of the substitute font by ConvertToRaster in step 302. In a preferred embodiment, the special hints identify the character of the selected font that was horizontally scaled the least by Scale. The special hints then extract the vertical stem width of the least scaled character and apply it to every other character in the selected font. This involves identifying the vertical stems of each character, then moving the edges of the vertical stems either together or apart so that the width of each vertical stem matches the width of the least scaled character's vertical stems.

In a further preferred embodiment, Scale stores an indication of which character it horizontally scaled the least and the scaling factor applied to that character for retrieval by the hints. ConvertToRaster preferably executes the hints for the least scaled character first. When executed, the hints for the least scaled character set a flag associated with the font specifying that, when the hints for the other characters are executed, their special hints sections will be executed. The hints for the least scaled character further access the scaling factor and set a standard vertical stem width value, represented in font units. When the hints for each of the other characters are executed, the character's special hints section is executed. The special hints section consists of instructions that override the distance, in font units, between character control points on the left and right sides of each of the character's vertical stems with the stored vertical stem width of the least scaled character. Thus overridden, when rasterized, the vertical stems of this character will be the same number of pixels wide as those of the least scaled character, resulting in a font with even color on each of the vertical stems.

While this invention has been shown and described with reference to preferred embodiments, it will be understood by those skilled in the art that various changes or modifications in form and detail may be made without departing from the spirit and scope of this invention. For example, instead of scaling the characters of a basis font horizontally to match an unavailable font, the facility could scale the characters of the basis font vertically to match the unavailable font. In this case, special hinting would regularize horizontal stem height instead of vertical stem width. Also, CreateBestFont could use methods other than those described to identify visually similar fonts. Further, the invention could be implemented within a smart display device instead of a general purpose computer. Still further, the fonts involved need not be for Roman alphabets. The same techniques could be applied to such diverse alphabets as Russian, Hebrew, Japanese, or Korean, or to nonalphabetic symbol fonts.

We claim:

1. A method in a computer system for providing a substitute font that visually approximates a requested font that is unavailable in the computer system, the requested font and the substitute font having respective sets of characters each of which have an overall width, the overall width having a leading width, an extent width, and a trailing width, the requested font and the substitute font being outline fonts, the method comprising;

receiving a request from a requesting program for a requested font;

determining that the requested font is unavailable in the computer system;

selecting as the substitute font to replace the requested font a font that is available in the computer system;

adjusting the overall widths of the characters of the substitute font to match the overall widths of corresponding characters of the requested font by adjusting the leading and trailing widths without adjusting the extent width so that the visual appearance of each character of the substitute font is not changed; and making the substitute font with the overall widths of the characters adjusted to match the overall widths of the requested font available to the requesting program so that when the requesting program displays characters using the substitute font and without further adjustment of the overall widths of the characters, the characters are displayed with overall widths that match the overall widths as if the characters had been displayed using the requested font.

2. The method of claim 1, further including the step of adjusting predetermined features in the characters of the substitute font prior to making the substitute font available so that the predetermined features in the characters of the substitute font are consistent with each other.

3. The method of claim 2 wherein one of the predetermined features in the characters of the substitute font is the width of stems of the characters.

4. The method of claim 3 wherein the stems that are adjusted are the vertical stems of the characters of the substitute font.

5. The method of claim 3 wherein the widths of the stems of the substitute font characters are adjusted to match the width of a stem of the substitute font character that has an overall width that is closest to the overall width of the corresponding selected font character so that the widths of the stems of the substituted fonts passed the substitute font to the program that has requested the selected font are equal.

6. The method of claim 1 wherein the computer system contains a plurality of fonts, and wherein the method further includes the step of comparing the characters of each of the fonts in the computer system to the characters of the selected font, and selecting as the substitute font a font that is visually similar to the selected font.

7. The method of claim 1, wherein the receiving step includes the step of receiving an indication of the identity of a requested font and an indication of the size at which the overall font is to be rendered, and wherein the determining step includes the step of determining that no font having the identity indicated by the received indication of identity is available in the computer system.

8. A method in a computer system for providing a substitute font for an unavailable font having characters with overall widths the unavailable font having a numerical characterization of its visual characteristics, the method comprising the steps of:

receiving a request from a requesting program for a requested font;

determining that the requested font is unavailable in the computer system;

identifying one or more candidate fonts that are available within the computer system to replace the unavailable font having numerical characterizations of their visual characteristics that differ from that of the unavailable font by less than a preselected maximum distance;

selecting a basis font from among the candidate fonts that has characters with overall widths, each of which is the sum of an extent width corresponding to the width of a visible portion of the character, a leading width corresponding to the width of blank space preceding the visible portion of the character, and a trailing width corresponding to the width of blank space succeeding the visible portion of the character; and for each character of the basis font, increasing or decreasing the leading width and trailing width, so that the overall width is equal to the overall width of the corresponding character of the unavailable font and so that the visual appearance of each character of the basis font is not changed wherein when the requesting program displays characters using the basis font with the increased or decreased leading widths and trailing widths the characters are displayed with overall widths that are equal to the overall widths of the corresponding character of the unavailable font without further increasing or decreasing of the overall widths of the dismayed characters.

9. The method of claim 8, further including the step of resizing the characters of the basis font both horizontally and vertically to match a requested height.

10. The methods of claim 8 or 9, further including the step of regularizing the characters of the basis font.

11. The methods of claim 10, further including the step of converting each of the regularized characters of the basis font to a character bitmap.

12. The method of claim 9 in which the selecting step selects the candidate font for which the overall width of each character deviates the least from that of the corresponding character of the unavailable font.

13. The method of claim 8 in which the selecting step selects the most visually similar candidate font for which the overall width of each character deviates from the corresponding character of the unavailable font by less than a threshold proportion.

14. A method in a computer system for creating a substitute font for an unavailable font using available fonts whose characters each have an overall width that is the sum of an extent corresponding to the width of a visible portion of the character, a leading width corresponding to the width of blank space preceding the visible portion of the character, and a trailing width corresponding to the width of blank space succeeding the visible portion of the character, one or more of the available fonts being horizontally scalable, the method comprising the steps of:

receiving a request from a requesting program for a requested font;

determining that the requested font is unavailable in the computer system;

determining whether the overall width of each character of an available font selected to replace the requested font is within a predetermined tolerance of the overall width of the corresponding character of the unavailable font;

if it is determined that the overall width of each character of an available font is within the predetermined tolerance of the overall width of the corresponding character of the unavailable font, increasing or decreasing the leading and trailing widths of each character of that available font so that the overall width of each character of that available font is equal to the overall character width of the corresponding character of the unavailable font and so that the visual appearance of each character of the basis font is not changed and wherein when the requesting program displays characters using the basis font with the increased or decreased leading widths and trailing widths, the characters are displayed with overall widths that are equal to the overall widths of the corresponding character of the unavailable font without further increasing or decreasing of the overall width of the displayed characters; and if it is determined that none of the available fonts has characters whose overall widths are all within the predetermined tolerance of the overall widths of the corresponding characters of the unavailable font, horizontally scaling the characters of a selected horizontally scalable font go that the overall width of each character of the selected font is equal to the overall width of the corresponding character of the unavailable font.

15. The method of claim 14, further including the step of selecting an available font that is visually similar to the unavailable font.

16. The method of claim 15, further including the step of regularizing the appearance of the horizontally scaled characters of the selected font.

17. The method of claim 16 wherein the characters of the selected font have vertical stems and in which the regularizing step includes the steps of:

identifying the character of the selected font whose overall width was changed the least by horizontal scaling; and changing the widths of the vertical stems in every character of the selected font to the width of the vertical stems in the identified character.

18. The method of claim 15 in which the selected available font used in the determining step is similar in appearance to the unavailable font.

19. A method in a computer system for creating a substitute font for an unavailable font using available fonts whose characters each have an overall height that is the sum of an extent corresponding to the height of a visible portion of the character, an upper height corresponding to the height of blank space above the visible portion of the character, and a lower height corresponding to the width of blank space below the visible portion of the character, one or more of the available fonts being vertically scalable, the method comprising the steps of:

receiving a request from a requesting program for a requested font;

determining that the requested font is unavailable in the computers system;

determining whether the overall height of each character of a selected available font to replace the requested font is within a predetermined tolerance of the overall height of a corresponding character of the unavailable font, the selected available font having a character that corresponds to each of the characters of the requested font;

if it is determined that the overall height of each character of an available font is within the predetermined tolerance of the overall height of the corresponding character of the unavailable font, increasing or decreasing the upper and lower heights of each character of that available font so that the overall height of each character of that available font is the same as the overall height of the corresponding character of the unavailable font and so that the visual appearance of each character of the available font is not changed and wherein when the requesting program displays characters using the available font with the increased or decreased upper heights and lower heights, the characters are displayed with overall heights that are equal to the overall heights of the corresponding character of the unavailable font without further increasing or decreasing of the overall heights of the displayed characters; and if it is determined that none of the available fonts has characters whose overall heights are all within the predetermined tolerance of the overall heights of the corresponding characters of the unavailable font, vertically scaling the characters of a selected vertically scalable font so that the overall height of each character of the selected font is the same as the overall height of the corresponding character of the unavailable font.

20. The method of claim 19, further including the step of selecting an available font that is visually similar to the unavailable font.

21. The method of claim 20, further including the step of regularizing the appearance of the vertically scaled characters of the selected font.

22. The method of claim 21 wherein the characters of the selected font have horizontal stems and in which the regularizing step includes the steps of:

identifying the character of the selected font whose overall height was changed the least by vertical scaling; and changing the heights of the horizontal stems in every character of the selected font to the height of the horizontal stems in the identified character.

23. A method in a computer system for providing a substitute font for an unavailable font having characters with overall widths, the method comprising the steps of:

receiving a request from a requesting program for a requested font;

determining that the requested font is unavailable in the computer system;

selecting a font to replace the requested font having characters with vertical stems and overall widths that is available within the computer system, the vertical stems each having a width measured horizontally, the overall widths including a leading width, an extent width and a trailing width;

scaling the characters of the selected font horizontally to match the overall character widths of the unavailable font without adjusting the extent width of the characters so that the visual appearance of each character is not changed;

resizing the scaled characters of the selected font both horizontally and vertically to match a requested height; and modifying the vertical stem widths of the resized characters of the selected font so that the vertical stem width of every resized character is the same wherein when the requesting program displays characters using the selected font after its characters have been scaled, resized, and modified, the characters are displayed with overall widths that match the overall widths as if the characters were displayed in the requested font, resized to the requested height without further adjusting of the overall widths of the displayed characters.

24. The method of claim 23, further including the step of converting the regularized characters of the substitute font each to a character bitmap.

25. The method of claim 23 in which the selecting step selects the selected font based on the classification of the unavailable font.

26. The method of claim 25 in which the selecting step selects a different selected font depending on whether the unavailable font is a serif font or a sans serif font.

27. A method in a computer system for creating a substitute font for an unavailable font using available fonts whose characters each have at overall width that is the sum of an extent corresponding to the width of a visible portion of the character, a leading width corresponding to the width of blank space preceding the visible portion of the character, and a trailing width corresponding to the width of blank space succeeding the visible portion of the character, one or more of the available fonts being horizontally scalable, the method comprising the steps of:

receiving a request from a requesting program for a requested font;

determining that the requested font is unavailable in the computer system;

identifying available fonts with appearances that are similar to the appearance of the unavailable font;

for each of the identified fonts, in the order of the identified fonts' similarity to the unavailable font, determining whether the overall width of each character of the identified font is within a predetermined tolerance of the overall width of the corresponding character of the unavailable font;

if it is determined that the overall width of each character of an identified font is within the predetermined tolerance of the overall width of the corresponding character of the unavailable font:

retrieving the identified font whose characters' overall widths were determined to be within a predetermined tolerance of the overall widths of the corresponding characters of the unavailable font, and increasing or decreasing the leading and trailing widths of each character of the retrieved font so that the overall width of each character of the retrieved font is equal to the overall width of the corresponding character of the unavailable font and so that the visual appearance of each character of the retrieved font is not changed and wherein when the requesting program displays characters using the retrieved font with the increased or decreased leading widths and trailing widths, the characters are displayed with overall widths that are equal to the overall widths of the corresponding character of the unavailable font without further increasing or decreasing of the overall widths of the displayed characters; and if it is determined that none of the available fonts has characters whose overall widths are all within the predetermined tolerance of the overall widths of the corresponding characters of the unavailable font:

selecting a horizontally scalable font, retrieving the selected font, horizontally scaling the characters of the selected font so that the overall width of each character of the selected font is equal to the overall width of the corresponding character of the unavailable font, and regularizing the appearance of the horizontally scaled characters of the selected font.

28. The method of claim 27 in which the regularizing step includes the steps of:

identifying the character of the selected font whose overall width was changed the least by horizontal scaling; and changing the widths of the vertical stems in every character of the selected font to the width of the vertical stems in the identified character.

29. An apparatus for providing a substitute font that visually approximates a requested font that is unavailable in the computer system, the requested font and the substitute font having respective sets of characters each of which have an overall width, the overall width having a leading width, an extent width, and a trailing width, the requested font and the substitute font being outline fonts, the apparatus comprising:

means for receiving a request from a requesting program for a requested font;

means for determining that the requested font is unavailable in the computer system;

means for selecting as the substitute font to replace the requested font a font that is available in the computer system;

means for adjusting the overall widths of the characters of the substitute font to match the overall widths of corresponding characters of the requested font by adjusting the leading and trailing widths without adjusting the extent width so that the visual appearance of each character of the substitute font is not changed; and means for making the substitute font with the overall widths of the characters adjusted to match the overall widths of the requested font available to the requesting program so that when the requesting program displays characters using the substitute font and without further adjustment of the overall widths of the characters, the characters are displayed with overall widths that match the overall widths as if the characters had been displayed using the requested font.

30. The apparatus of claim 29, further including means for adjusting predetermined features in the characters of the substitute font prior to making the substitute font available so that the predetermined features in the characters of the substitute font are consistent with each other.

31. The apparatus of claim 30 wherein one of the predetermined features in the characters of the substitute font is the widths of stems of the characters.

32. The apparatus of claim 31 wherein the stems that are operated upon by the adjusting means are the vertical stems of the characters of the substitute font.

33. The apparatus of claim 31 wherein the adjusting means adjusts widths of the stems of the substitute font characters to match the width of a stem of the substitute font character that has an overall width that is closest to the overall width of the corresponding selected font character so that the widths of the stems of the substituted fonts passed the substitute font to the program that has requested the selected font are equal.

34. The apparatus of claim 29 wherein the computer system contains a plurality of fonts, and wherein the apparatus further includes means for comparing the characters of each of the fonts in the computer system to the characters of the selected font, and selecting as the substitute font a font that is visually similar to the selected font.

35. An apparatus for providing a substitute font for an unavailable font having characters with overall widths, the apparatus comprising:

means for receiving a request from a requesting program for a requested font;

means for determining that the requested font is unavailable in the computer system;

means for identifying one or more candidate fonts that are available within the computer system to replace the unavailable font having compact numerical characterizations that differ from that of the unavailable font by less than a preselected maximum distance;

means for selecting a font from among the candidate fonts that has characters with overall widths, each of which is the sum of a leading width, an extent width, and a trailing width; and means for increasing or decreasing the leading width and trailing width for each character of the selected font without adjusting the extent width, so that the overall width is equal to the overall width of the corresponding character of the unavailable font and so that the visual appearance of each character of the selected font is not changed wherein when the requesting program displays characters using the selected font with the increased or decreased leading widths and trailing widths, the characters are displayed with overall widths that are equal to the overall width of the corresponding character of the unavailable font without further increasing or decreasing of the overall widths of the displayed characters.

36. The apparatus of claim 35, further including means for resizing the characters of the selected font both horizontally and vertically to match a requested height.

37. The apparatus of claim 35 or 36, further including means for regularizing the characters of the selected font.

38. The apparatus of claim 37, further including a raster converter that converts means for the regularized characters of the selected font each to a character bitmap.

39. The apparatus of claim 35 in which the selecting means selects the most visually similar candidate font for which the overall width of each character deviates from the corresponding character of the unavailable font by less than a threshold proportion.

40. The apparatus of claim 39 in which the selecting means selects the candidate font for which the overall width of each character deviates the least from that of the corresponding character of the unavailable font.

41. An apparatus for creating a substitute font for an unavailable font using available fonts whose characters each have an overall width that is the sum of an extent width corresponding to the width of a visible portion of the character, a leading width corresponding to the width of blank space preceding the visible portion of the character, and a trailing width corresponding to the width of blank space succeeding the visible portion of the character, one or more of the available fonts being horizontally scalable, the apparatus comprising:

means for receiving a request from a requesting program for a requested font;

means for determining that the requested font is unavailable in the computer system;

means for determining whether the overall width of each character of a selected available font to replace the requested font is within a predetermined tolerance of the overall width of the corresponding character of the unavailable font;

means for increasing or decreasing the leading and trailing widths of each character of that available font so that the overall width of each character of that available font is equal to the overall character width of the corresponding character of the unavailable font if it is determined that the overall width of each character of an available font is within the predetermined tolerance of the overall width of the corresponding character of the unavailable font so that the visual appearance of each character of the available font is not changed and wherein when the requesting program displays characters using the available font with the increased or decreased leading widths and trailing widths, the characters are displayed with overall widths that are equal to the overall widths of the corresponding character of the unavailable font without further increasing or decreasing of the overall widths of the displayed characters; and means for horizontally scaling the characters of a selected horizontally scalable font so that the overall width of each character of the selected font is equal to the overall width of the corresponding character of the unavailable font if it is determined that none of the available fonts has characters whose overall widths are all within the predetermined tolerance of the overall widths of the corresponding characters of the unavailable font.

42. The apparatus of claim 41, further including means for selecting an available font that is visually similar to the unavailable font.

43. The apparatus of claim 42, further including means for regularizing the appearance of the horizontally scaled characters of the selected font.

44. The apparatus of claim 43 wherein the characters of the selected font have vertical stems and in which the regularizing means includes:

means for identifying the character of the selected font whose overall width was changed the least by horizontal scaling; and means for changing the widths of the vertical stems in every character of the selected font to the width of the vertical stems in the identified character.

45. The apparatus of claim 42 in which the selected available fonts considered by the determining means is similar in appearance to the unavailable font.

46. An apparatus for creating a substitute font for an unavailable font using available fonts whose characters each have an overall height that is the sum of all extent corresponding to the height of a visible portion of the character, an upper height corresponding to the height of blank space above the visible portion of the character and a lower height corresponding to the width of blank space below the visible portion of the character, one or snore of the available fonts being vertically scalable, the apparatus comprising:

means for receiving a request from a requesting program for a requested font;

means for determining that the requested font is unavailable in the computer system;

means for determining whether the overall height of each character of a selected available font to replace the requested font is within a predetermined tolerance of the overall height of the corresponding character of the unavailable font;

means for increasing or decreasing the upper and lower heights of each character of that available font so that the overall height of each character of that available font is equal to the overall character height of the corresponding character of the unavailable font if it is determined that the overall height of each character of an available font is within the predetermined tolerance of the overall height of the corresponding character of the unavailable font and so that the visual appearance of each character of the available font is not changed wherein when the requesting program displays characters using the available font with the increased or decreased upper heights and lower heights, the characters are displayed with overall heights that are equal to the overall heights of the corresponding character of the unavailable font without further increasing or decreasing of the overall heights of the displayed characters; and means for vertically scaling the characters of a selected vertically scalable font so that the overall height of each character of the selected font is equal to the overall height of the corresponding character of the unavailable font if it is determined that none of the available fonts has characters whose overall heights are all within the predetermined tolerance of the overall heights of the corresponding characters of the unavailable font.

47. The apparatus of claim 46, further including means for selecting an available font that is visually similar to the unavailable font.

48. The apparatus of claim 47, further including means for regularizing the appearance of the vertically scaled characters of the selected font.

49. The apparatus of claim 48 wherein the characters of the selected font have horizontal stems and in which the regularizing means includes:

means for identifying the character of the selected font whose overall height was changed the least by vertical scaling; and means for changing the heights of the horizontal stems in every character of the selected font to the height of the horizontal stems in the identified character.

50. A computer-readable medium containing instructions for causing a computer system to provide a substitute font that visually approximates a requested font that is unavailable in the computer system, the requested font and the substitute font having respective sets of characters each of which have an overall width, the overall width having a leading width, an extent width, and a trailing width, the requested font and the substitute font being outline fonts, by:

receiving a request for a requested font; and when the requested font is unavailable, selecting as the substitute font to replace the requested font a font that is available;

adjusting the overall widths of the characters of the substitute font to match the overall widths of corresponding characters of the requested font by adjusting the leading and trailing widths so that the visual appearance off each character of the substitute font is not changed; and making the substitute font with the overall widths of the characters adjusted to match the overall widths of the requested font available for use in place of the requested font so that when the requesting program displays characters using the substitute font and without further adjustment of the overall widths of the characters, the characters are displayed with overall widths that match the overall widths as if the characters had been displayed using the requested font.

51. The computer-readable medium of claim 50, further including adjusting predetermined features in the characters of the substitute font prior to making the substitute font available so that the predetermined features in the characters of the substitute font are consistent with each other.

52. The computer-readable medium of claim 51 wherein one of the predetermined features in the characters of the substitute font is the width of stems of the characters.

53. The computer-readable medium of claim 52 wherein the stems that are adjusted are the vertical stems of the characters of the substitute font.

54. The computer-readable medium of claim 52 wherein the widths of the stems of the substitute font characters are adjusted to match the width of a stem of the substitute font character that has an overall width that is closest to the overall width of the corresponding selected font character so that the widths of the stems of the substituted fonts passed the substitute font to the program that has requested the selected font are equal.

55. The computer-readable medium of claim 50 wherein the computer system contains a plurality of fonts, and further including comparing the characters of each of the fonts in the computer system to the characters of the selected font, and selecting as the substitute font a font that is visually similar to the selected font.

56. A computer-readable medium containing instructions for causing a computer system to provide a substitute font for an unavailable font having characters with overall widths, the unavailable font having a numerical characterization of its visual characteristics, by:

receiving a request for a requested font; and when the requested font is unavailable, identifying one or more candidate fonts that are available to replace the unavailable font having numerical characterizations of their visual characteristics that differ from that of the unavailable font by less than a preselected maximum distance;

selecting a basis font from among the candidate fonts that has characters with overall widths, each of which is the sum of an extent width corresponding to the width of a visible portion of the character, a leading width corresponding to the width of blank space preceding the visible portion of the character, and a trailing width corresponding to the width of blank space succeeding the visible portion of the character; and for each character of the basis font, increasing or decreasing the leading width and trailing width, so that the overall width is equal to the overall width of the corresponding character of the unavailable font and so that the visual appearance of each character of the basis font is not changed wherein when the requesting program displays characters using the basis font with the increased or decreased leading widths and trailing widths the characters arc displayed with overall widths that are equal to the overall widths of the corresponding character of the unavailable font without further increasing or decreasing of the overall widths of the displayed characters.

57. The computer-readable medium of claim 56, further including resizing the characters of the basis font both horizontally and vertically to match a requested size.

58. The computer-readable medium of claim 56, further including the step of regularizing the characters of the basis font.

59. The computer-readable medium of claim 58, further including converting each of the regularized characters of the basis font to a character bitmap.

60. The computer-readable medium of claim 56 in which the selecting of a basis font selects the candidate font for which the overall width of each character deviates the least from that of the corresponding character of the unavailable font.

61. The computer-readable medium of claim 56 in which the selecting of a basis font selects the most visually similar candidate font for which the overall width of each character deviates from the corresponding character of the unavailable font by less than a threshold proportion.

* * * * *